Oct. 19, 1965
R. J. PRESTON
3,212,496
MOLECULAR PHYSIOLOGICAL MONITORING SYSTEM
Filed Aug. 21, 1962
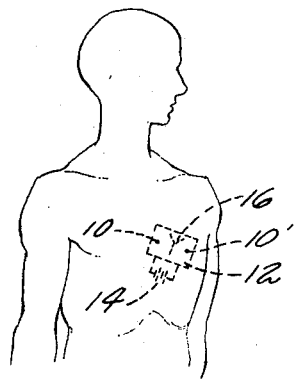
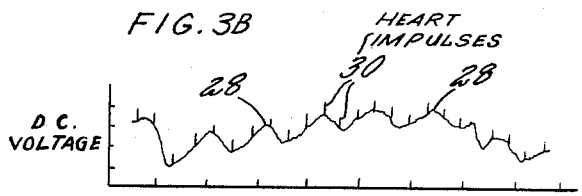
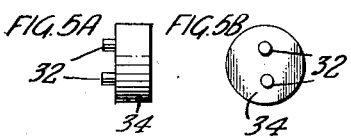
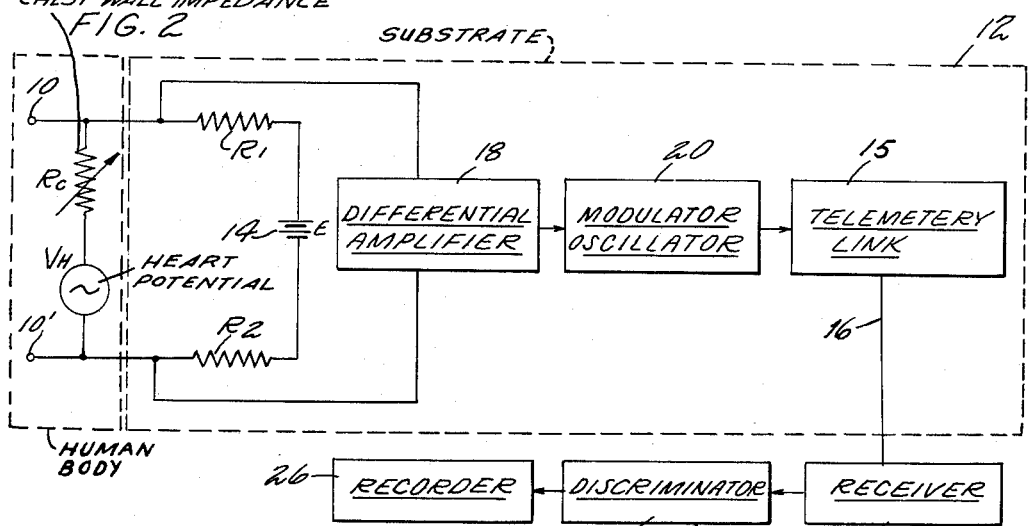
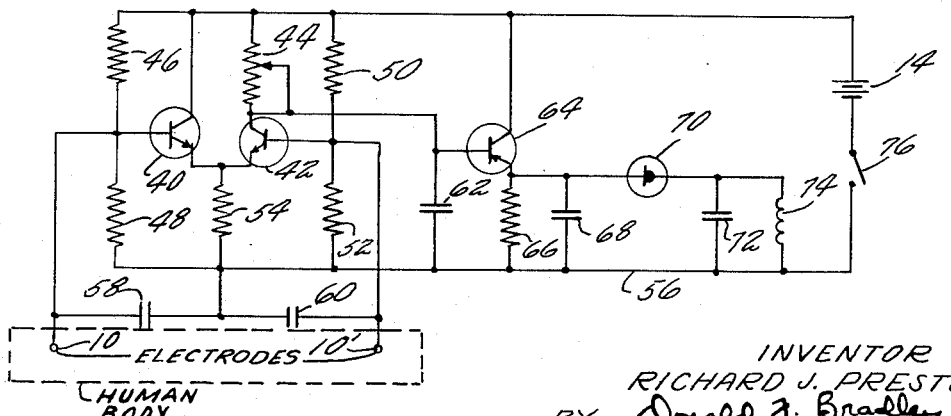
INVENTOR
RICHARD J. PRESTON
BY Donald J. Bradley
AGENT

United States Patent Office 3,212,496
Patented Oct. 19, 1965

3,212,496
MOLECULAR PHYSIOLOGICAL MONITORING SYSTEM
Richard J. Preston, Springfield, Mass., assignor to United Aircraft Corporation, East Hartford, Conn., a corporation of Delaware
Filed Aug. 21, 1962, Ser. No. 218,265
5 Claims. (Cl. 128—2.06)

This invention relates to apparatus for measuring physiological parameters, and particularly to apparatus for simultaneously measuring electrocardiogram, respiration rate and respiration volume by means of a single measurement and signal conditioning channel.

With the advent of the space age, there is a need for sensors which have the ability to monitor physiological parameters such as heart function and respiration to thereby determine man's reactions to space travel. In addition, hospitals are becoming more automated and a requirement exists for equipment to monitor physiological data in bed-ridden patients and thereby reduce the necessity of continuous human observation. This invention meets the above needs and comprises a miniature transducer containing molecular electronic circuits which may be implanted, subcutaneous or external to the human body and which will simultaneously transmit electrocardiogram and respiration data with or without the use of wires.

The need for transducers to monitor respiration and EKG has long been recognized. As early as 1935, it was found that transthoracic impedance changes occur as a function of respiration, and that cardiac activity has some effect upon the impedance changes. Later an impedance system was developed for recording respiration in animals and man using electrodes inserted subcutaneously in the chest wall. More recently Geddes et al. have developed an impedance pneumograph which uses electronic circuitry to measure electrocardiogram and respiration. See "Aerospace Medicine," January, 1962, page 28 et seq. These prior tests have used alternating current generated by an outside power source to measure the impedance change across the chest wall. The measurements are usually made externally by means of electrodes affixed to the chest wall using a conductive grease, or by electrodes positioned just under the skin.

One of the disadvantages of the A.C. type of monitor used in the prior art is the fact that detrimental stimulation of the myocardium may occur. Also, interference between the A.C. power generator and the data telemetry channel can occur and cause serious signal degradation. The transducer described in this invention uses D.C. and produces no polarization effects in the body tissues due to the extremely low current density through the body tissues between the electrodes. An unbalanced D.C. differential amplifier provides the amplification of the physiological data. The monitor, by utilizing molecular circuitry, may be implanted in a human, animal or fish, or the electrodes may be placed just under the skin, or the measurements can be made externally. When used as an implant, a miniature battery such as is used in the Pacemaker may also be implanted, together with molecular oscillators and antennas, to thereby transmit the information outside the patient without the use of wires.

It is therefore an object of this invention to provide a novel apparatus which has the ability to simultaneously measure EKG, respiration rate and respiration volume from the same channel and electrodes.

A further object of this invention is a transducer to monitor EKG and respiration as a bipolar signal with electrodes placed from one to 3 centimeters apart adjacent the heart area of the body.

Another object of this invention is to provide a miniature physiological monitor which may be implanted, subcutaneous or external.

A further object of this invention is a novel physiological monitor utilizing D.C. voltages and an unbalanced differential amplifier which produces no polarization effects of the tissues due to extremely low current flow.

Another object of this invention is a physiological monitor utilizing molecular electronic circuits which considerably diminish the size, weight, and power dissipation and prevent discomfort as from present monitors.

A further object of this invention is a novel physiological monitor which produces an output signal having a much higher signal to noise to ratio than present devices because of the close component proximity of the circuitry to the parameters being measured, which therefore allows better analysis of the EKG than formerly possible.

These and other objects and a fuller understanding of the invention may be had by referring to the following description and claims read in conjunction with the accompanying drawings which illustrate an embodiment of the invention.

FIGURE 1 is a representation of the human torso with the apparatus of the invention schematically depicted in the approximate prefered location; and FIGURE 2 is a schematic block diagram of the monitor apparatus.

FIGURE 3A shows a normal electrocardiogram; and

FIGURE 3B is a waveform of respiration rate and volume with EKG superimposed thereon as produced in actual experiments; and FIGURE 4 shows one type of electronic circuit including a differential amplifier which may be used with this invention; and FIGURES 5A and 5B show an actual implant having button electrodes.

Refering now to FIGURE 1, a representative schematic of the apparatus of this invention and its approximate location in the human body to measure EKG and respiration is shown. A pair of tantalum or stainliess steel needle-type or flat electrodes 10 and 10' are physically attached to a molecular integrated circuit substrate 12. Substrate 12 also contains other circuits such as an amplifier, as will subsequently be explained. A source of D.C. power such as a mercury battery 14 is connected with the molecular circuit substrate 12. The electrodes 10 and 10' are implanted, positioned under the skin or fastened externally to the skin as desired, and impedance changes across the electrodes and voltages produced by the heart are transmitted to an outside recording device by wires or a transmitter having an antenna 16.

The electrodes 10 and 10' may be thin wires which extend laterally from the sides of the substrate 12, but it has been found that when implanting the entire assembly, a pair of electrodes in the form of short buttons 32 are preferable, the buttons 32 being positioned on the flat portion of the encapsulated substrate 34 as shown in FIGURE 5. To implant, the skin adjacent the heart area is cut and lifted, and the entire assembly including the power supply and telemetry equipment is inserted between the skin and the muscle layer. The skin is then sutured shut. It is immaterial whether the electrodes contact the muscle layer or the skin, but there must be some contact, and experiments have given very good results in both positions. The optimum location for the implant is slightly below the nipple adjacent the heart, with the electordes slanted at approximately 45° and the electrodes contacting the muscle layer, the electrodes being 1 to 3 centimeters apart.

For subcutaneous or external use, two small hook electrodes of approximately number 30 gauge would be hooked directly to the skin or taped on the skin at the level of the 4th interspace of the midline. Electronically the electrodes feed a differential input amplifier and additional stages of amplification are added if necessary. If telemetry is employed, a single stage oscillator may be utilized to transmit the signal information. A tunnel diode oscillator is used in preference to transistor oscillator for frequency stability. Such oscillator circuits are well known in the art.

In addition to measuring EKG, the electrodes 10 and 10' are subjected to chest wall impedance changes or input load resistance changes which markedly affect the characteristics of the amplifier and act as a strong differential input signal. It is well known in the art that impedance changes in the chest wall occur as a function of respiration volume. In most previous work such measurements have been made with high impedance single ended amplifier circuits with 50 to 100 kc. frequency oscillators and decoupling transformers employed. EKG may not be accurately measurable under these conditions because its signal level is considerably lower than the level of impedance input changes, besides being considerably higher in frequency.

FIGURE 2 shows in block diagram form the prefered apparatus. Electrodes 10 and 10' are deposited on substrate 12 by known techniques, as are the other circuits shown enclosed in the dotted lines. Battery 14 may be a cadmium or mercury cell connected to the back of the substrate 12 of any other type of D.C. power supply. D.C. current is fed from battery 14 through resistors $R_1$ and $R_2$ to electrodes 10. $R_c$ represents the impedance of the chest across the electrodes which varies with respiration. $V_h$ represents the voltage produced by the heart-muscular potential, this voltage being A.C. and at a rate of 70–140 c.p.s. That the heart produces a voltage $V_h$ is well known, and this voltage is the basis of many devices for measuring EKG. The voltage across the electrodes is fed to an unbalanced differential amplifier 18 which produces a D.C. voltage proportional to the difference between the voltage at electrode 10 and the voltage at electrode 10'. This voltage is shown in FIGURE 3B, and is a composite of the change in voltage produced by the impedance variation across the chest wall, and the voltage added by the heart at $V_h$. The output from amplifier 18 is fed to an oscillator 20 where the output is FM modulated upon an A.C. carrier of approximately 84 mc. To eliminate bioelectric signals from the respiration channel without sacrifice of recording fidelity requires that a signal frequency above 50 kc. be used. This FM modulated signal is fed to a transmitter or telemetering system 15 and antenna 16 to be transmitted outside the body without the use of wires. A wire transmission system may be used, but for implants the wire piercing the skin is a source of possible infection, so that a wireless transmission system is preferred. Even for external application, true dynamic monitoring may be more readily performed without wires or remote electrodes. Transmission distances which produce accurate reliable data of up to 50 feet have been obtained with a planar deposited coil having no antenna, and with an overall input power of approximately 600 microwatts.

Receiver 22 picks up the transmitted signal, and the signal is demodulated by discriminator 24 and the heart-respiration signal recorded at 26 upon a tape recorder, scope or other recording or display device. Results from numerous implant and external tests show that the signals transmitted by the molecular circuitry have a good signal to noise ratio, exhibit stability and are reliable in operation.

The entire electronics system is deposited upon the thin substrate 12 which may be approximately ½″ x ½″ x 30 mils thick, or which may be cylindrical as shown in FIGURE 5, thus making the unit extremely compact and free of any discomfort to the subject. The D.C. power supply can be attached to the back of the substrate, adding little to the size of the unit and resulting in a completely self-contained unit.

FIGURE 3A shows the waveform of a normal electrocardiogram, while FIGURE 3B shows an actual waveform obtained by an experiment using the apparatus of this invention. The experiment was performed at the University of Pennsylvania. Two electrodes were placed subcutaneously on the thorax of an anesthetized dog. The anterior thorax was sheared and electrode placement sites were marked on the mid-sternal line at the level of the 3rd and 7th ribs and 2 cm. bilaterally from this line at approximately the cortastural juncture of the 3rd, 4th, 5th, 6th and 7th ribs. Needles were placed subcutaneously at each of these 12 electrode sites and from the multiple combination of any two of them, the animal's EKG superimposed upon the chest impedance signal was recorded on a conventional recording oscillograph. Timing markers along the side of the trace gave a direct indication of respiration rate and the area integrated under the curve when calibrated to the particular animal and referenced to an impedance measurement across the electrodes on the chest wall gave an indication of respiration volume.

A test using a male subject was performed for further evaluation of the apparatus and for this purpose two needles were placed subcutaneously without patient discomfort, each 1 cm. lateral to the midline at the level of the fourth interspace.

FIGURE 3B shows that this invention measures and reproduces a perfect EKG signal 30 superimposed upon a respiration rate and volume signal 28. Differentiation between EKG and respiration signals is easily determined by use of the unbalanced amplifier. The frequency of respiration is consideraly lower than the other frequencies and therefore can be quite simply filtered into a separate channel leaving a present EKG signal in another channel. Respiration volume is determined by means of integrating the area under the curves produced as a function of the impedance changes in the chest wall and calibrating to the lung volume of the particular animal or individual being monitored by a conventional spirometer. Respiration rate is determined by the peaks in the respiration volume curves.

FIGURE 4 shows schematically the actual molecular differential amplifier and oscillator circuits used in experiments and implants. Electrodes 10 and 10' are connected to the base junctions of transistors 40 and 42 respectively, and a battery 14 of, for example, nickle-cadmium, supplies a D.C. voltage directly to the collector junction of transistor 40 and through rheostat 44 to the collector of transistor 42. Rheostat 44 may be adjusted to change the unbalance of the differential amplifier formed by transistors 40 and 42. Resistors 46, 48, 50 and 52 form voltage divider networks biasing the transistor base junctions, and these resistors may also be varied to produce the desired unbalance. A resistor 54 is connected between the transistor emitters and a common line 56.

The voltage across the electrodes 10, 10' is fed to the transistor base junctions with capacitors 58 and 60 filtering any high frequency A.C. components in the noise region. The output from the differential amplifier is taken from the collector of transistor 42 and RC coupled across capacitor 62 to the base of transistor 64. Transistor 64 is an emitter follower, and its output is taken from emitter resistor 66 and filter capacitor 68 to to tunnel diode 70. The output of the tunnel diode is a tuned circuit comprising capacitor 72 and inductor 74. Tunnel diode 70 and the tank circuit form an oscillator circuit, and the output of the emitter follower modulates the bias on the tunnel diode to thereby produce an output from the tunnel diode which is frequency modulated as a function of the voltage or impedance across electrodes 10 and 10'. A typical frequency is about 84 mc. This output FM signal may be transmitted by wire or telemetered as described above.

A switch 76 is connected in the circuit. This may, for an implant, be an electromagnetic switch which may be turned on and off by an electromagnetic wave, thus controlling the entire transducer without the use of wires.

It is to be understood that the invention is not limited to the specific embodiment herein illustrated and described, but may be used in other ways without departure from its spirit as defined by the following claims.

I claim:

1. A physiological measuring apparatus for simultaneously measuring the heart rate, respiration rate and respiration volume of a living body comprising
   a pair of electrodes impervious to body fluids,
   means for positioning said pair of electrodes in contact with a living body adjacent the heart area thereof,
   means for generating a D.C. current flow through the portion of the body between said electrodes and producing a first voltage between said electrodes as a function of the body impedance therebetween,
   said electrodes also sensing the voltage produced by the beating of the heart of said body whereby a second voltage proportional thereto is produced between said electrodes,
   an amplifier having a pair of input terminals,
   and means electrically connecting said electrodes with said amplifier input terminals whereby said amplifier produces an output voltage having a component proportional to said first voltage produced by impedance changes in the portion of the body between said electrodes and indicative of body respiration rate and volume, and having a component proportional to said second voltage produced by the heartbeat and indicative of body heart rate.

2. Apparatus as in claim 1 in which said pair of electrodes is positioned between approximately one and three centimeters apart.

3. Apparatus as in claim 1 in which said amplifier is an unbalanced D.C. differential amplifier.

4. Apparatus as in claim 3 in which said means for generating a D.C. current is a battery, said battery also being connected to produce an unbalanced input to said D.C. differential amplifier.

5. Apparatus as in claim 1 in which said electrodes are in the form of short buttons mounted on a substrate.

References Cited by the Examiner

UNITED STATES PATENTS

| | | | |
|---|---|---|---|
| 2,944,542 | 7/60 | Barnett et al. | 128–2.05 |
| 2,958,781 | 11/60 | Marchal et al. | 128–2.1 X |
| 3,029,808 | 4/62 | Kagan | 128–2.06 |
| 3,052,233 | 9/62 | Veling | 128–2.1 |
| 3,057,356 | 10/62 | Greatbatch | 128–422 |
| 3,085,566 | 4/63 | Tolles | 128–2.1 |

RICHARD A. GAUDET, *Primary Examiner.*

JORDAN FRANKLIN, SIMON BRODER, *Examiners.*